(12) United States Patent
Aoyama et al.

(10) Patent No.: US 7,117,838 B2
(45) Date of Patent: Oct. 10, 2006

(54) INTERNAL COMBUSTION ENGINE

(75) Inventors: Shunichi Aoyama, Kanagawa (JP); Katsuya Moteki, Tokyo (JP); Kenshi Ushijima, Kanagawa (JP); Naoki Takahashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/982,914

(22) Filed: Nov. 8, 2004

(65) Prior Publication Data
US 2005/0103305 A1    May 19, 2005

(30) Foreign Application Priority Data
Nov. 19, 2003    (JP) .............................. 2003-388641

(51) Int. Cl.
*F01B 30/14* (2006.01)
(52) U.S. Cl. ................................. 123/197.1; 123/197.4
(58) Field of Classification Search ............. 123/197.1, 123/197.4
See application file for complete search history.

(56) References Cited

U.S. PATENT DOCUMENTS

| 4,827,896 | A | * | 5/1989 | Adams ....................... 123/53.5 |
| 5,894,763 | A | * | 4/1999 | Peters ......................... 74/598 |
| 6,058,894 | A | * | 5/2000 | Kobayashi et al. ...... 123/41.56 |
| 6,178,932 | B1 | * | 1/2001 | Matsuda et al. ........... 123/54.4 |
| 6,637,384 | B1 | * | 10/2003 | Mendler .................... 123/48 B |
| 2002/0073944 | A1 | * | 6/2002 | Moteki et al. ............ 123/78 E |
| 2005/0205043 | A1 | * | 9/2005 | Schmidt et al. .......... 123/197.1 |

FOREIGN PATENT DOCUMENTS

JP    2001-227367 A    8/2001

* cited by examiner

*Primary Examiner*—Stephen K. Cronin
*Assistant Examiner*—Jason Benton
(74) *Attorney, Agent, or Firm*—Foley & Lardner LLP

(57) ABSTRACT

In an internal combustion engine, a piston reciprocating in a cylinder and a crankshaft are linked with each other by a piston-crank linking mechanism. The crankshaft includes a counterweight. When the piston is located in the proximity of a bottom dead center, an outermost portion of the counterweight crosses an imaginary extension line extended from a piston pin in an axial direction of the piston pin.

16 Claims, 8 Drawing Sheets

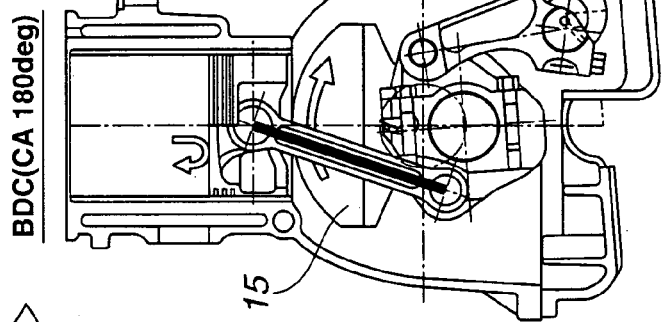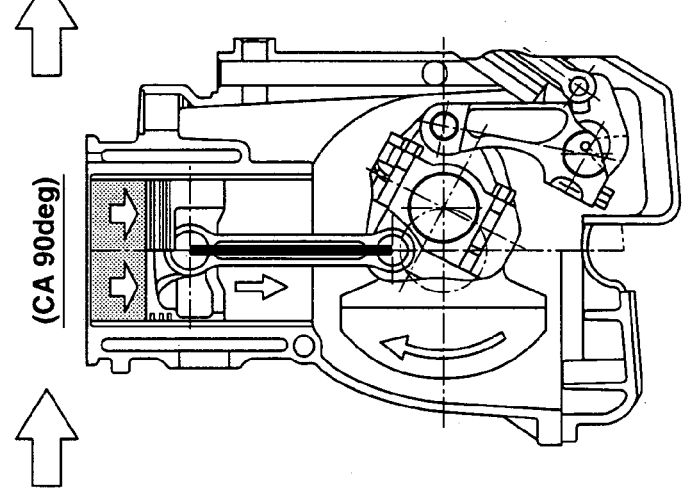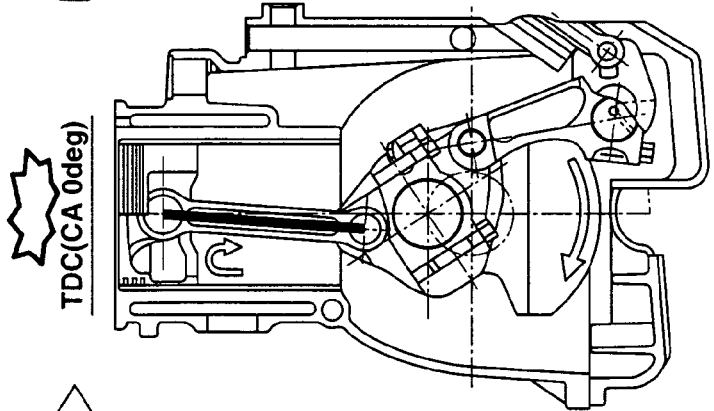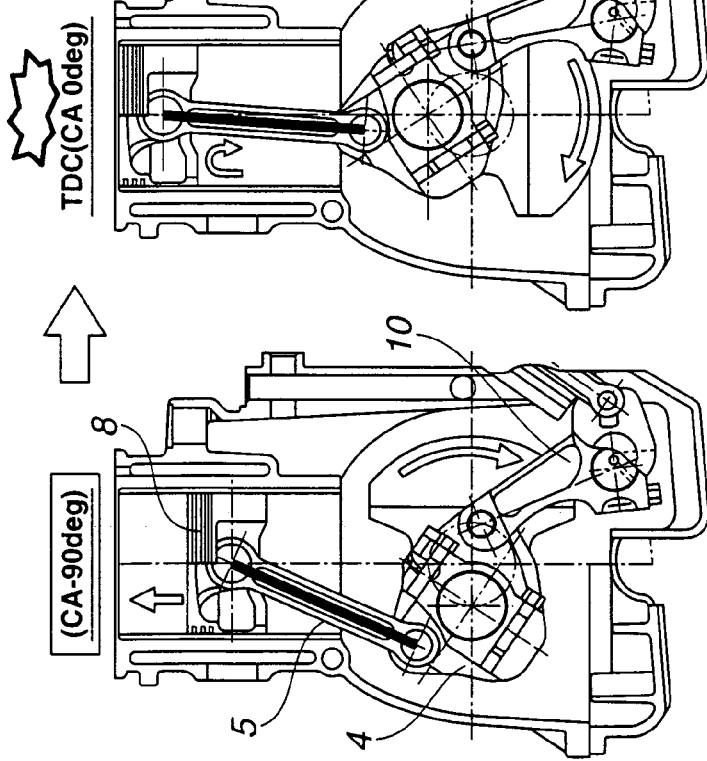

INTERNAL COMBUSTION ENGINE

BACKGROUND OF THE INVENTION

The present invention generally relates to an internal combustion engine having a piston crank mechanism for reciprocating a piston, and more particularly, to a diesel engine or an inner-cylinder direct injection gasoline engine having such a piston crank mechanism.

Japanese Patent Application Publication No. 2001-227367 discloses a variable compression ratio mechanism of an internal combustion engine using a multilink piston crank mechanism, which was previously proposed by the applicant of the present application. This mechanism links a piston and a crankpin with each other by an upper link and a lower link. One end of the upper link is connected with the piston via a piston pin. The other end of the upper link is connected with the lower link via a first connection pin. The lower link is mounted rotatably on the crankpin of a crankshaft. This mechanism restrains movement of the lower link by a control link having one end connected with the lower link via a second connection pin. The other end of the control link is supported on a lower part of a cylinder block, for example, via a cam mechanism. The center of swinging motion of the other end of the control link can be shifted by the cam mechanism so as to vary a top dead center of the piston, and thereby vary a compression ratio of the engine.

SUMMARY OF THE INVENTION

Performances of an inner-cylinder injection engine, such as a diesel engine or an inner-cylinder direct injection gasoline engine, largely depend on a shape of a combustion chamber and a characteristic of a gas flow. For a diesel engine, the combustion chamber shape and the gas flow characteristic are significant factors in determining not only an emission performance but an output performance because the combustion chamber shape and the gas flow characteristic greatly influence an air utilization rate during a full-load operation. One of measures for enlarging an engine displacement and increasing an engine output of such internal combustion engine is to elongate a piston stroke. However, with a general single-link piston crank mechanism, elongating a piston stroke to a long stroke and thereby making a displacement per cylinder larger than a certain value may raise a tendency of causing a poor combustion at a low speed operation. In a gasoline engine, when a volume displacement per cylinder becomes large, flame propagation takes a relatively long time, and therefore makes a combustion unstable at a low speed operation where a gas flow is small. If the engine is set with a high compression ratio or an advanced ignition timing to improve such poor combustion, the engine becomes prone to a knocking, which is not appropriate for practical use as an internal combustion engine. Further, in an inline four-cylinder internal combustion engine, elongating a piston stroke may cause a sharp increase in secondary inertia vibration of the piston, and thereby aggravate a noise vibration characteristic. Besides, elongating a piston stroke may entail an increase in size of the internal combustion engine.

It is an object of the present invention to provide an internal combustion engine having an engine displacement enlarged without increasing a basic size of the engine or aggravating a noise vibration characteristic.

According to one aspect of the present invention, an internal combustion engine includes: a piston reciprocating in a cylinder; a crankshaft including a counterweight having an outermost portion to cross an imaginary extension line extended from a piston pin in an axial direction of the piston pin when the piston is located in proximity of a bottom dead center; and a piston-crank linking mechanism linking the piston with the crankshaft.

The other objects and features of this invention will become understood from the following description with reference to the accompanying drawings.

BRIEF DESCRIPTION OF THE DRAWINGS

FIGS. 2A, 2B, 2C and 2D are illustrations used for explaining a basic operation of a multilink piston crank mechanism used in the variable compression ratio mechanism.

DETAILED DESCRIPTION OF THE INVENTION

Figure 1:
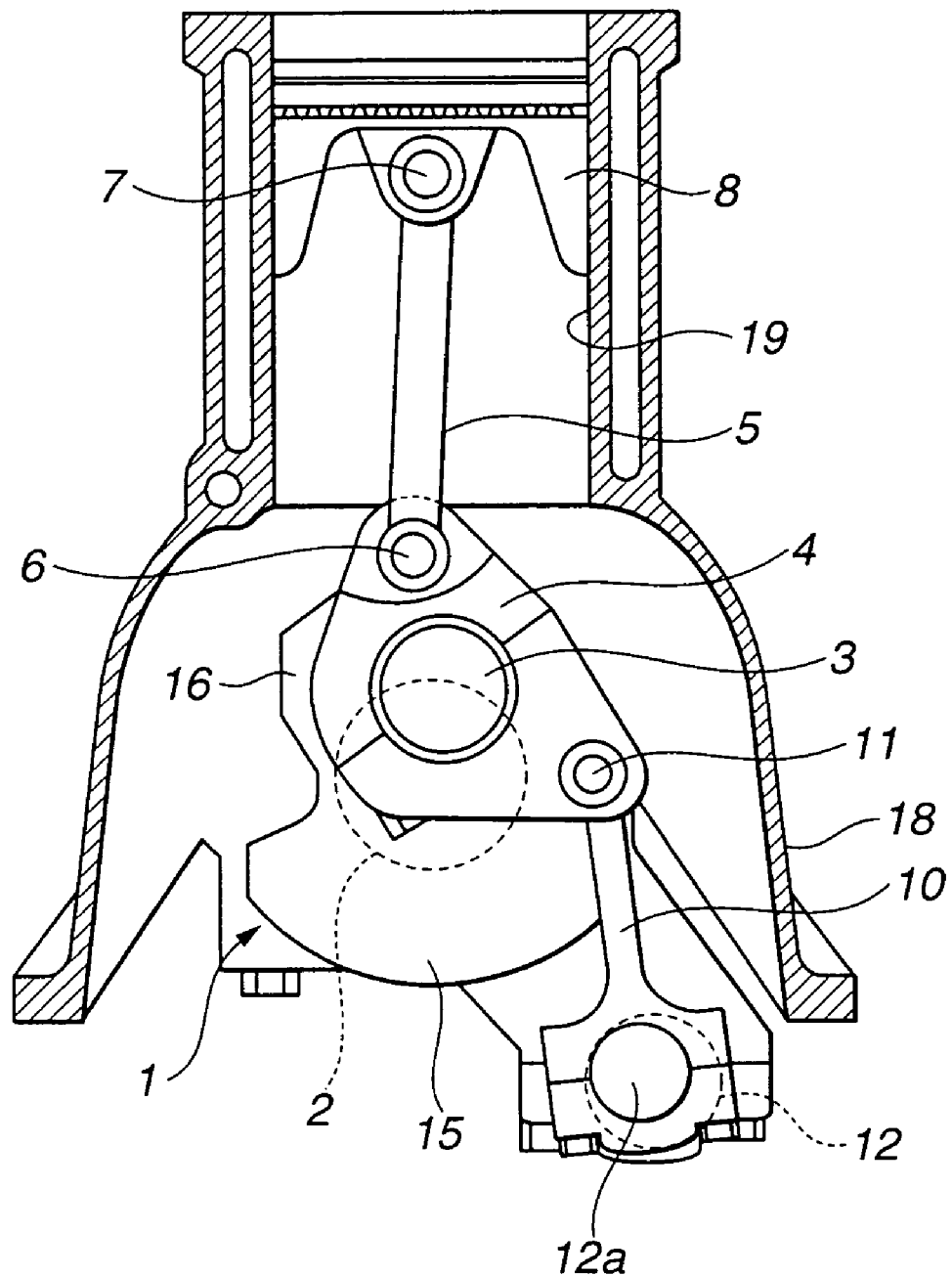
FIG. 1 is a vertical sectional view showing a variable compression ratio mechanism used in an internal combustion engine according to an embodiment of the present invention.

FIG. 1 is a vertical sectional view showing a variable compression ratio mechanism used in an internal combustion engine according to an embodiment of the present invention. In this example, the internal combustion engine of this example is an inner-cylinder direct injection gasoline engine. The variable compression ratio mechanism is composed of a multilink piston crank mechanism or piston-crank linking mechanism or linkage including a lower link 4, an upper link 5 and a control link 10.

The internal combustion engine of FIG. 1 includes a crankshaft 1, and a cylinder block 18 housing cylinders 19, and also includes the multilink piston crank mechanism and a piston 8 for each of cylinders 19. Crankshaft 1 includes a journal portion 2 and a crankpin 3 for each cylinder. Journal portion 2 is supported rotatably on a main bearing of cylinder block 18. Crankpin 3 is eccentric from journal portion 2 by a predetermined distance. Lower link 4 is connected rotatably with crankpin 3. Crankshaft 1 also includes counterweights 15 and crank webs 16. Each oh crank webs 16 connects journal portion 2 and crankpin 3. Counterweights 15 each extend from crank web 16 in a direction away from crankpin 3, and include a circumferential portion formed in an arc-shape around journal portion 2. Counterweights 15 oppose each other across crankpin 3 in an axial direction of crankpin 3. Piston 8 reciprocates in cylinder 19 by combustion pressure.

Lower link 4 is divisible into right and left portions, and includes a connection hole surrounded by the right and left portions. Crankpin 3 is fit in the connection hole.

Upper link 5 includes a lower end connected rotatably with one end of lower link 4 by a first connection pin 6, and an upper end connected rotatably with piston 8 by a piston pin 7.

The internal combustion engine of FIG. 1 also includes a control shaft 12. Control link 10 includes an upper end connected rotatably with the other end of lower link 4 by a second connection pin 11, and a lower end connected rotatably with a lower part of cylinder block 18 via control shaft 12. Control link 10 thereby restrains movement of lower link 4. The lower part of cylinder block 18 forms a part of the engine body. Control shaft 12 is supported rotatably on the engine body, and includes an eccentric cam 12a which is eccentric from an axis of the rotation of control shaft 12. The lower end of control link 10 is fit rotatably over eccentric cam 12a.

The rotational position of control shaft 12 is controlled by a compression ratio control actuator operating in accordance with a control signal from an engine control unit.

With the above-described variable compression ratio mechanism using the multilink piston crank mechanism, when control shaft 12 is rotated by the compression ratio control actuator, the central position of eccentric cam 12a varies relative to the engine body. This varies the position of the lower end of control link 10 which is supported movably relative to the engine body by eccentric cam 12a and control shaft 12. The variation of the support position of control link 10 varies a stroke of piston 8, and a vertical position of piston 8 at a top dead center (TDC). Thus, the variable compression ratio mechanism can vary a compression ratio of the engine. In this example, at least control shaft 12 forms a support position varying section to vary the position of the lower end of control link 10 relative to the engine body.

FIGS. 2A, 2B, 2C and 2D are illustrations used for explaining a basic operation of the multilink piston crank mechanism. FIGS. 2A to 2D illustrate cyclic operations of the elements of the mechanism at every 90° CA (crank angle) in the course of the crankshaft making one rotation (360° CA). FIG. 2B indicates the top dead center (TDC) of piston 8. As shown in FIG. 2B, varying the position of the lower end of control link 10 shifts piston 8 in a vertical direction of the cylinder, and thereby varies the compression ratio.

Figure 10:
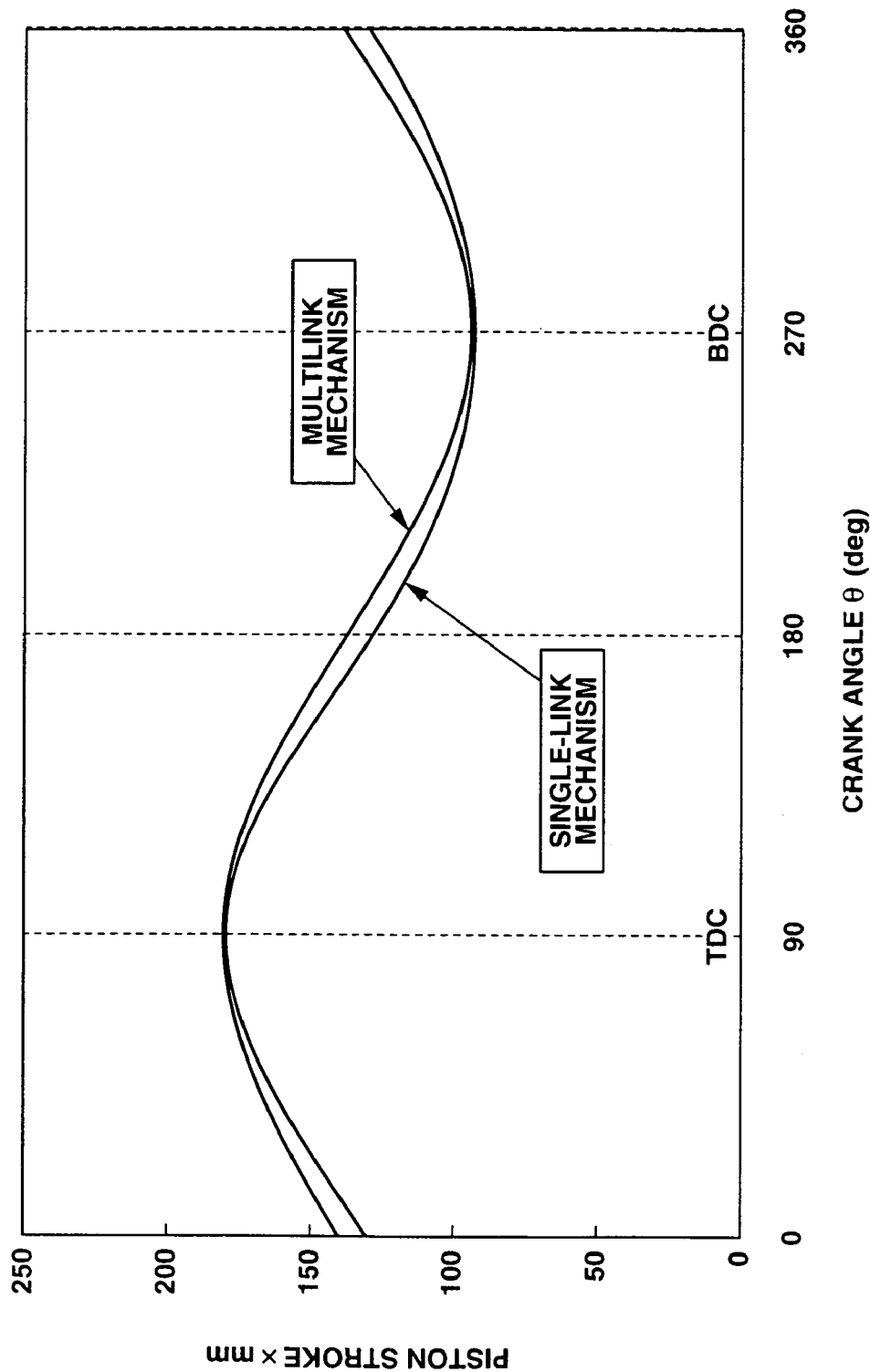
FIG. 10 is a graph showing a piston stroke characteristic of the multilink piston crank mechanism of FIG. 1.
Figure 11:
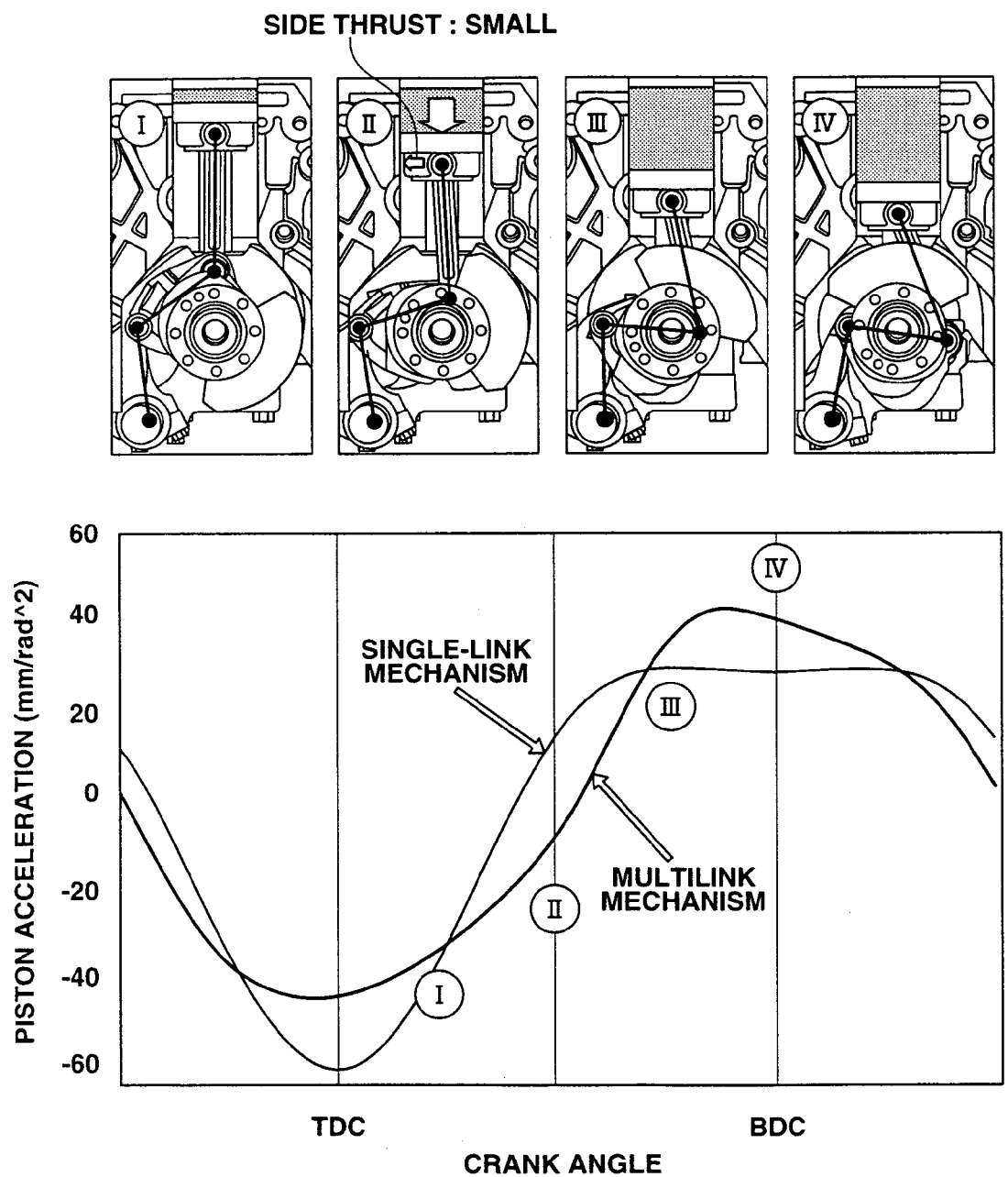
FIG. 11 is a graph showing a piston acceleration characteristic of the multilink piston crank mechanism of FIG. 1.

FIG. 10 is a graph showing a piston stroke characteristic of the multilink piston crank mechanism. FIG. 11 is a graph showing a piston acceleration characteristic of the multilink piston crank mechanism. The above-described multilink variable compression ratio mechanism using the multilink piston crank mechanism can provide a piston stroke characteristic approximate to simple harmonic oscillation by setting a link dimension determined by lower link 4, upper link 5 and control link 10. Especially, as shown in FIG. 10, the multilink variable compression ratio mechanism can exhibit a piston stroke characteristic which is more approximate to simple harmonic oscillation than a piston stroke characteristic of a general single-link piston crank mechanism. Then, as shown in FIG. 11, a piston acceleration of piston 8 of the multilink variable compression ratio mechanism is leveled, and a maximum inertial force is largely reduced in the proximity of the top dead center (TDC). When the multilink variable compression ratio mechanism exhibits the above-mentioned piston stroke characteristic approximate to simple harmonic oscillation, a piston speed of piston 8 in the proximity of the top dead center is approximately 20% slower than that of the single-link piston crank mechanism.

Figure 3:
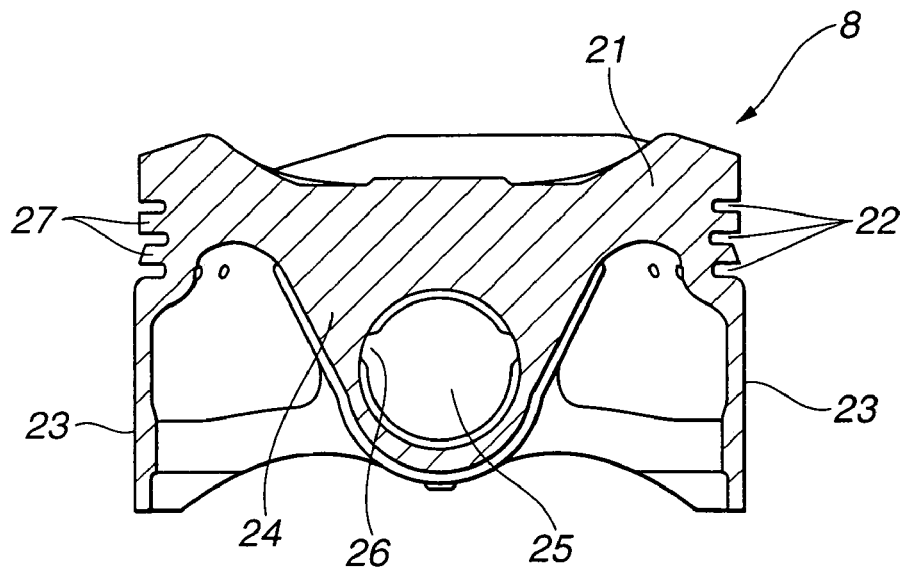
FIG. 3 is a vertical sectional view of a piston used in the multilink piston crank mechanism of FIG. 1, as taken along a plane orthogonal to the axis of a crankshaft.
Figure 4:
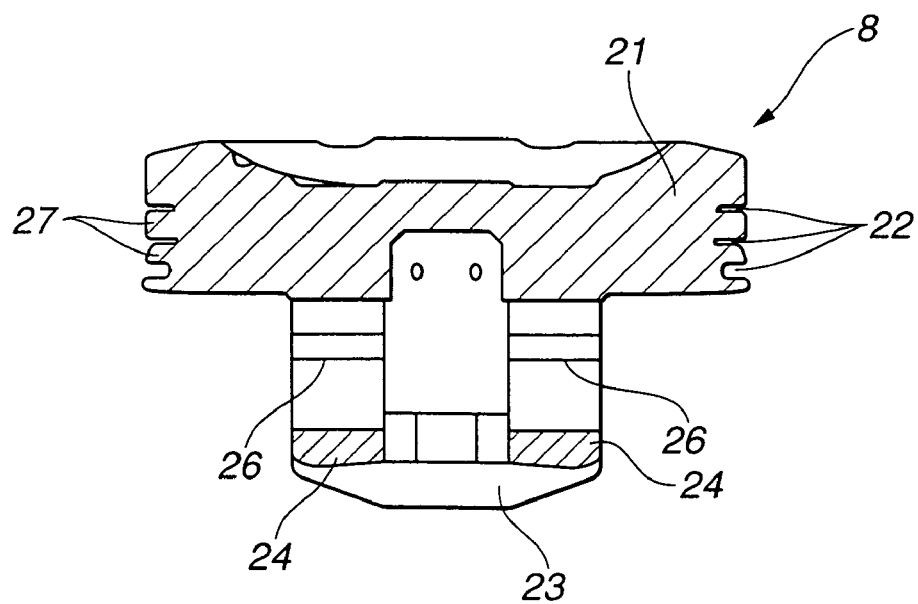
FIG. 4 is a side sectional view of the piston of FIG. 3, as taken along a plane parallel to the axis of the crankshaft.
Figure 5:
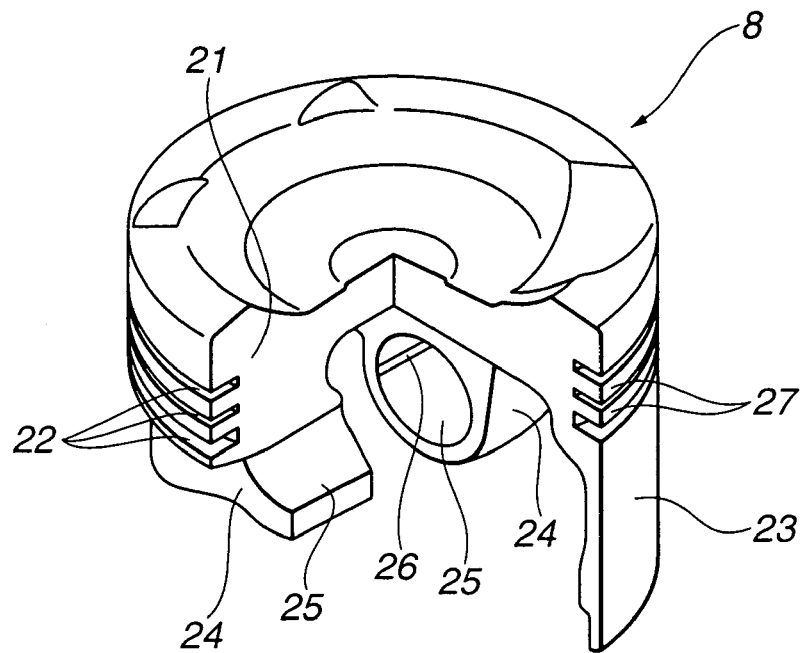
FIG. 5 is a perspective cutaway view of the piston of FIG. 3.
Figure 6:
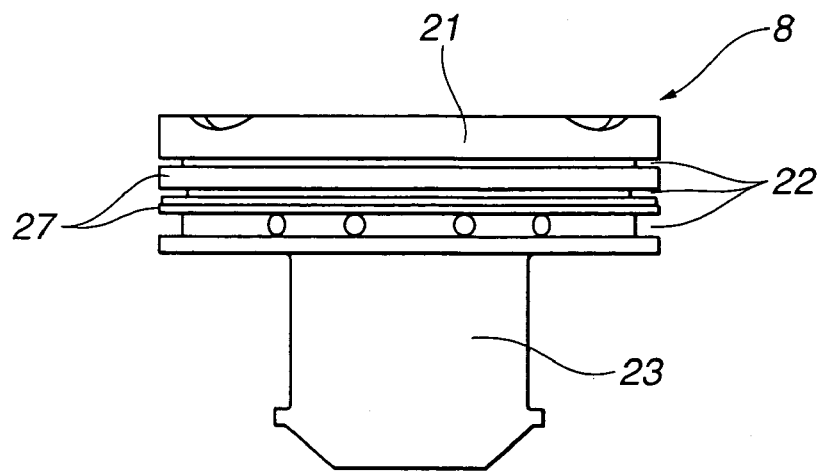
FIG. 6 is a side view of the piston of FIG. 3.
Figure 7:
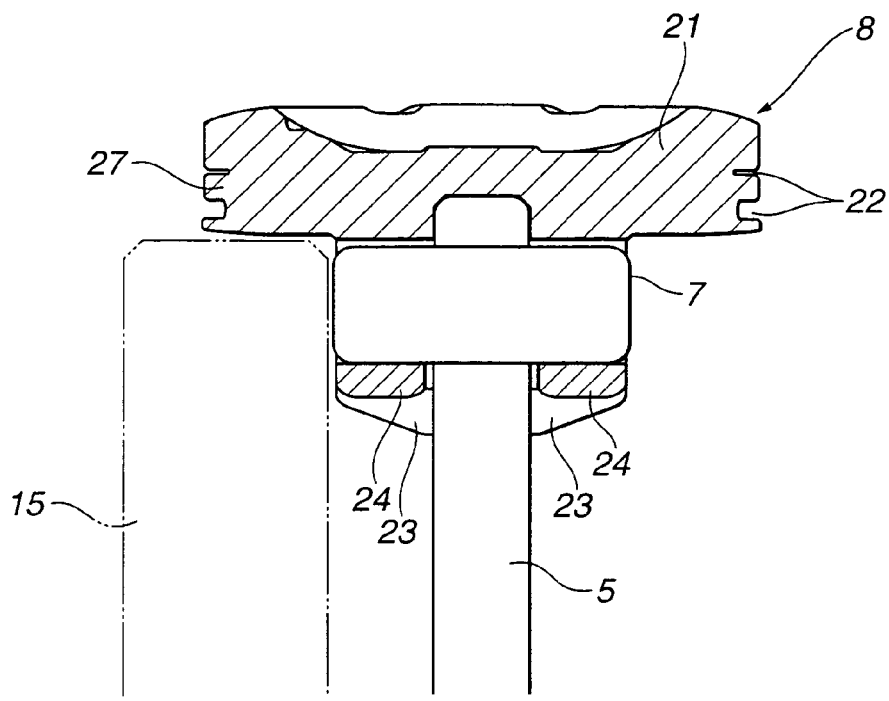
FIG. 7 is a side sectional view showing a positional relationship of the piston at a bottom dead center and a counterweight used in the internal combustion engine of FIG. 1.

FIG. 3 is a vertical sectional view of piston 8 taken along a plane orthogonal to the axis of crankshaft 1. FIG. 4 is a side sectional view of piston 8 taken along a plane parallel to the axis of crankshaft 1. FIG. 5 is a perspective cutaway view of piston 8. FIG. 6 is a side view of piston 8. Piston 8 of this example is cast integrally by using an aluminum alloy, and includes a piston crown or piston head portion 21, piston-ring groove portions 22, and first and second skirt portions 23. Piston head portion 21 has a relatively thick circular form including a circumferential portion formed around a circumferential direction of the piston head portion 21. Piston-ring groove portions 22 are formed in the circumferential portion of piston head portion 21 in the circumferential direction. In FIGS. 3 to 6, piston 8 includes three piston-ring groove portions 22. First and second skirt portions 23 are formed, respectively, on thrust and counterthrust sides of the circumferential direction of piston 8, and extend from the circumferential portion downwardly along an inner circumference of cylinder 19. A projected shape of each of skirt portions 23, as viewed from a direction orthogonal to the axis of piston pin 7, is substantially rectangular, as shown in FIG. 6. As shown in FIG. 7, each of skirt portions 23 has a width substantially equal to or shorter than an overall length of piston pin 7, as compared in a direction parallel to the axis of piston pin 7. That is, each of skirt portions 23 is provided in a considerably small range in the circumferential direction.

Piston 8 also includes a pair of pin boss portions 24 formed at a central part of piston 8 and spaced from each other. Each of pin boss portions 24 protrudes at a central part of the underside of piston head portion 21, and includes a pin hole 25 extending through pin boss portion 24 in the axial direction of piston pin 7. Ends of piston pin 7 are fit rotatably in pin holes 25. Each of pin holes 25 includes a pair of oil grooves 26 formed in an inside surface of pin hole 25 and extending in the axial direction of piston pin 7.

Figure 9:
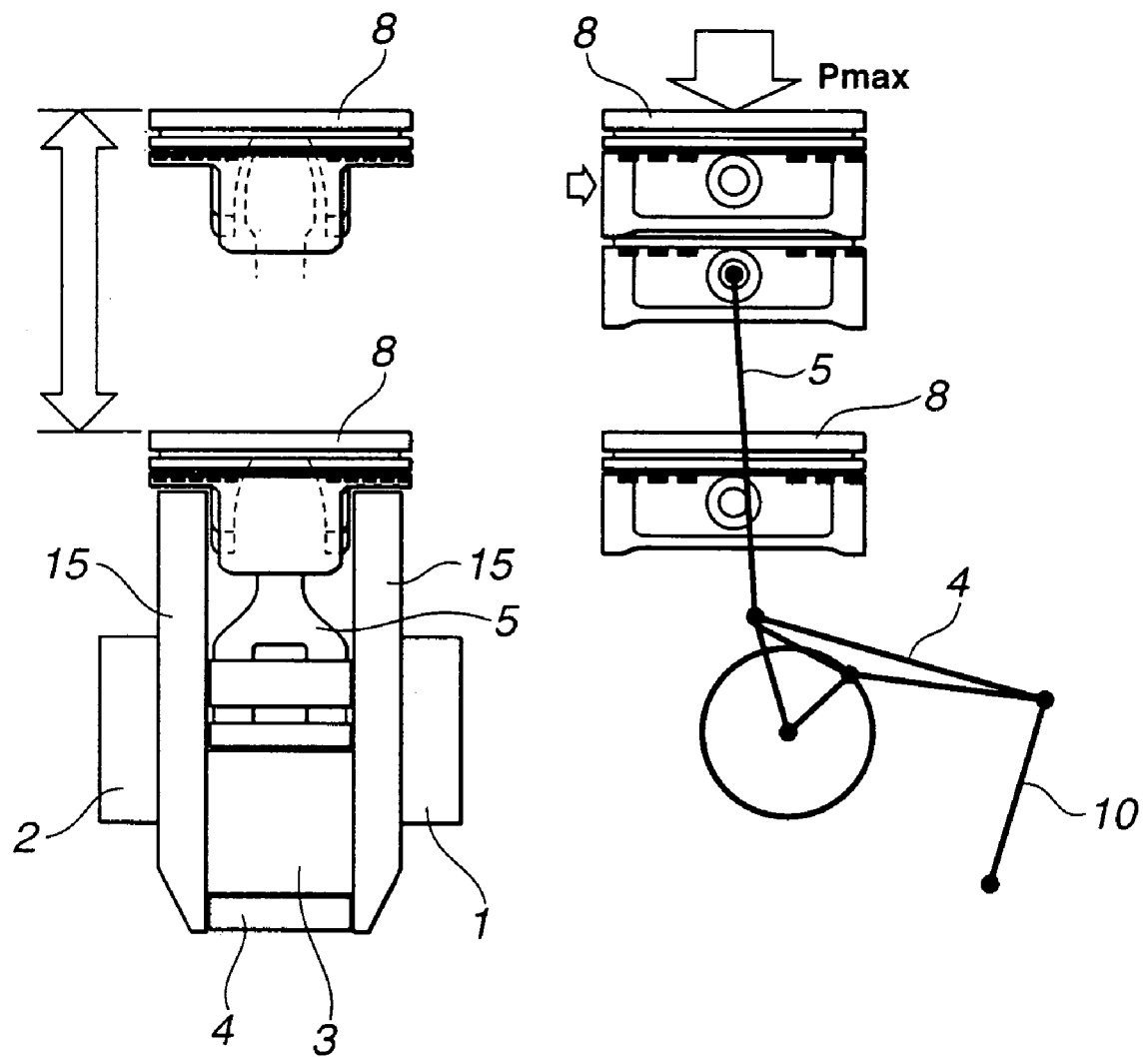
FIG. 9 is a diagram for explaining a piston stroke of the multilink piston crank mechanism of FIG. 1.

FIG. 7 is a side sectional view showing upper link 5, counterweight 15 and piston 8 at a bottom dead center. FIG. 9 is a diagram for explaining a stroke of piston 8. Upper link 5 of this example is made of steel. The upper end of upper link 5 extends through a gap between pin boss portions 24. Piston pin 7 is pressed into the upper end of upper link 5 at the gap, and thereby connects the upper end of upper link 5 with piston 8, as shown in FIG. 7. The lower end of upper link 5 is branched into two parts supporting both ends of first connection pin 6, and thereby is connected with lower link 4, as shown in FIG. 9.

At the upper and lower ends of upper link 5, piston pin 7 and first connection pin 6 have an equal axial length. Besides, piston pin 7 and first connection pin 6 receive a basically equal load. Therefore, piston pin 7 and first connection pin 6 have an equal diameter or sectional size.

Pin boss portions 24 and piston pin 7 form a piston connection structure for connecting piston 8 with upper link 5. A size of the piston connection structure, as measured in the axial direction of piston pin 7, is considerably smaller than a diameter of each of piston 8 and cylinder 19, as shown in FIGS. 7 and 9.

When piston 8 is located in the proximity of the bottom dead center, an outermost portion of counterweight 15 crosses an imaginary extension line extended from piston pin 7 in the axial direction, as shown in FIG. 7. That is, when piston 8 is located in the proximity of the bottom dead center, the outermost portion of counterweight 15 passes the side of pin boss portion 24 and piston pin 7 without conflicting with pin boss portion 24 and piston pin 7. Thus, at the bottom dead center, piston 8 is located at a considerably small distance from the axis of crankshaft 1. Piston 8 of FIG. 7 is located closer to the axis of crankshaft 1 than the piston of FIG. 2D and FIG. 11-IV. FIG. 2D and FIG. 11-IV are illustrations used for explaining a basic operation of the multilink piston crank mechanism, and therefore depicts counterweight 15 spaced from piston pin 7 in the vertical direction.

Figure 8:
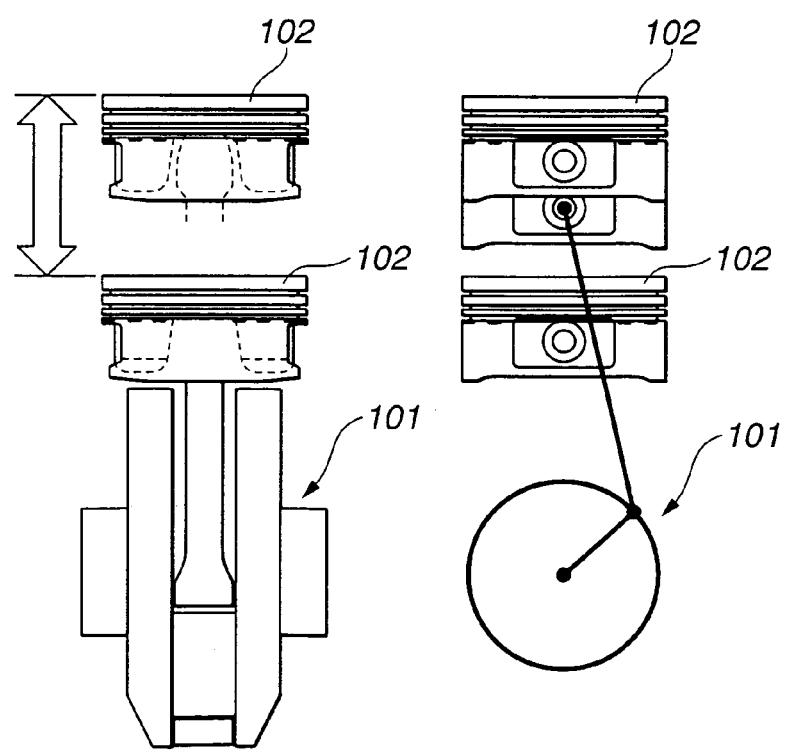
FIG. 8 is a diagram for explaining a piston stroke of a general single-link piston crank mechanism of earlier technology.

FIG. 8 shows a piston stroke of a piston 102 combined with a general single-link piston crank mechanism 101 of earlier technology. FIG. 9 shows a piston stroke of the multilink piston crank mechanism of this embodiment. The piston strokes are each indicated by an arrow between a top dead center and a bottom dead center. The piston stroke of FIG. 9 is elongated largely, compared to the piston stroke of FIG. 8. Thus, the multilink piston crank mechanism of this embodiment can increase an engine displacement of the internal combustion engine without increasing a size of the engine. As an example, the multilink piston crank mechanism of this embodiment can elongate the piston stroke by approximately 20%.

Piston 8 of this embodiment includes the small skirt portions 23 as mentioned above. Therefore, when counterweight 15 passes the side of pin boss portion 24, counterweight 15 does not conflict with skirt portion 23, as shown in FIGS. 7 and 9. In this invention, skirt portion 23 does not need to be formed with a large degree of strength or rigidity, but can be formed with a minimum size, because the multilink piston crank mechanism of this invention undergoes a smaller amount of side thrust load acting to tilt piston 8 than a general single-link piston crank mechanism. Specifically, piston 8 undergoes a maximum combustion pressure in an early stage of an expansion stroke, and therefore, in the proximity of the stage of FIG. 2C, piston head portion 21 undergoes a maximum load. In this stage, upper link 5 is postured substantially upright with a considerably small inclination with respect to the axis of cylinder 19, as indicated in FIG. 2C and FIG. 9. Especially, the inclination of upper link 5 with respect to the axis of cylinder 19 can be made smaller than an inclination of a connecting rod of the single-link piston crank mechanism of FIG. 8. Therefore, piston 8 of this invention undergoes a smaller side thrust load, and can include the small skirt portions 23.

As mentioned above, when the multilink piston crank mechanism of this embodiment provides the piston stroke characteristic approximate to simple harmonic oscillation, the piston acceleration of piston 8 is leveled, and the maximum inertial force is largely reduced in the proximity of the top dead center. Therefore, pin boss portion 24 receiving piston pin 7 can be made smaller as mentioned above.

Besides, if single-link piston crank mechanism 101 of FIG. 8 includes a crankpin offset farther from the center of a crankshaft and thereby elongates the piston stroke of piston 102 to a long stroke, piston 102 undergoes a larger amount of side thrust load. In this case, piston 102 not only cannot include a small skirt portion, and but cannot operate appropriately to serve as a practically usable engine. By contrast, the multilink piston crank mechanism of this invention can elongate the piston stroke without piston 8 undergoing a large amount of side thrust load, and thus piston 8 can properly include the small skirt portions 23.

The multilink piston crank mechanism of this invention is preferred for use in an inline four-cylinder engine. Generally, in such an inline four-cylinder engine, elongating a piston stroke may cause a sharp increase in secondary inertia vibration of the piston, and thereby aggravate a noise vibration characteristic. By contrast, the multilink piston crank mechanism of this invention can provide the piston stroke characteristic approximate to simple harmonic oscillation, and thus can increase an engine displacement by elongating the piston stroke without aggravating such noise vibration characteristic.

Further, when the multilink piston crank mechanism of this invention exhibits the piston stroke characteristic approximate to simple harmonic oscillation, the piston speed of piston 8 in the proximity of the top dead center becomes slower than the single-link piston crank mechanism. Thus, the multilink piston crank mechanism of this invention secures a sufficient time for a combustion at a same combustion rate, as compared to the single-link piston crank mechanism, and thus can enable an excellent combustion in a combustion chamber having a large displacement per cylinder.

Piston 8 of FIGS. 3 to 6 includes two piston rings or compression rings 27 between three piston-ring groove portions 22. Piston 8 of FIG. 7 includes one compression ring 27 between two piston-ring groove portions 22. Piston 8 of this invention includes small pin boss portion 24 and piston pin 7, and therefore has a lightweight lower part. Thus, piston 8 including one compression ring 27 is advantageous not only in stabilizing the behavior of piston 8 around piston pin 7, but in elongating the piston stroke.

As mentioned above, the internal combustion engine of this invention may be an inline four-cylinder engine including: first, second, third and fourth cylinders 19 arranged in line; first, second, third and fourth pistons 8 reciprocating respectively in the first, second, third and fourth cylinders 19; a crankshaft 1 including first, second, third and fourth counterweights 15 each having an outermost portion to cross an imaginary extension line extended from one of first, second, third and fourth piston pins 7 in an axial direction of the piston pin 7 when one of the first, second, third and fourth pistons 8 is located in proximity of a bottom dead center; and first, second, third and fourth piston-crank linking mechanisms linking the first, second, third and fourth pistons 8, respectively, with the crankshaft 1.

This application is based on a prior Japanese Patent Application No. 2003-388641 filed on Nov. 19, 2003. The entire contents of this Japanese Patent Application No. 2003-388641 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An internal combustion engine, comprising:
    a piston reciprocating in a cylinder;
    a crankshaft including a counterweight having an outermost portion to cross an imaginary extension line extended from a piston pin in an axial direction of the piston pin when the piston is located in proximity of a bottom dead center; and
    a piston-crank linking mechanism linking the piston with the crankshaft.

2. The internal combustion engine as claimed in claim 1, wherein the piston-crank linking mechanism is a multilink piston-crank linking mechanism including: an upper link having a first end connected with the piston by the piston pin; a lower link having a first end connected with a second end of the upper link by a first connection pin, and mounted rotatably on a crankpin of the crankshaft; and a control link having a first end connected with a second end of the lower link by a second connection pin and a second end supported movably relative to a body of the internal combustion engine.

3. The internal combustion engine as claimed in claim 2, wherein the piston pin and the first connection pin are substantially equal to each other in axial length.

4. The internal combustion engine as claimed in claim 2, wherein the piston includes first and second pin boss portions receiving first and second ends of piston pin, respectively; and the first end of the upper link extends through a gap between the first and second pin boss portions, and is fit over the piston pin.

5. The internal combustion engine as claimed in claim 2, wherein the piston includes first and second skirt portions formed respectively on thrust and counterthrust sides of a circumferential direction of the piston; and each of the first and second skirt portions is substantially equal to the piston pin in width in the axial direction of the piston pin.

6. The internal combustion engine as claimed in claim 2, wherein the piston includes first and second skirt portions formed respectively on thrust and counterthrust sides of a circumferential direction of the piston; and each of the first and second skirt portions is smaller than the piston pin in width in the axial direction of the piston pin.

7. The internal combustion engine as claimed in claim 2, further comprising a support position varying section to vary a position of the second end of the control link relative to the body of the internal combustion engine, and thereby to vary a compression ratio of the internal combustion engine.

8. The internal combustion engine as claimed in claim 7, wherein the support position varying section includes a control shaft supported rotatably on the body of the internal combustion engine, and including an eccentric cam fit rotatably in the second end of the control link.

9. The internal combustion engine as claimed in claim 2, wherein the upper link is positioned with a small inclination with respect to an axis of the cylinder when the piston is located at a position at which the piston undergoes a maximum combustion pressure.

10. The internal combustion engine as claimed in claim 2, wherein the piston-crank linking mechanism links the piston with the crankshaft so that the piston reciprocates in the cylinder in accordance with rotation of the crankshaft with a piston stroke having a characteristic approximate to simple harmonic oscillation.

11. The internal combustion engine as claimed in claim 1, wherein the internal combustion engine is configured as an inline four-cylinder engine.

12. The internal combustion engine as claimed in claim 1, wherein the counterweight projects outwardly beyond a piston head portion of the piston in the axial direction of the piston pin.

13. The internal combustion engine as claimed in claim 1, wherein the crankshaft includes two of the counterweights on opposite sides of a crankpin.

14. The internal combustion engine as claimed in claim 1, wherein the piston includes a compression ring in a piston-ring groove.

15. An internal combustion engine, comprising:
a crankshaft including first and second counterweights each having an outermost portion;
a piston-crank linkage;
a piston connected with the crankshaft by the piston-crank linkage, the piston including a head portion, first and second skirt portions, and first and second pin boss portions respectively supporting both ends of a piston pin connecting the piston with the piston-crank linkage, the piston being formed with first and second recesses between which the first and second pin boss portions and the first and second skirt portions are formed, the first and second recesses being so shaped as to allow the outermost portions of the first and second counter weights to pass, respectively, through the first and second recesses of the piston, and to reach a state in which the first and second pin boss portions of the piston descend into a gap formed between the outermost portions of the first and second counterweights.

16. The internal combustion engine as claimed in claim 15, wherein the piston-crank linkage is a multi-link mechanism arranged to reciprocate the piston between a top dead center and a bottom dead center at which the first and second pin boss portions of the piston descend into the gap between the outermost portions of the first and second counterweights.

* * * * *